United States Patent [19]

Webster

[11] Patent Number: 4,852,851

[45] Date of Patent: Aug. 1, 1989

[54] VALVE WITH FLEXIBLE SHEET MEMBER

[75] Inventor: Milo E. Webster, Braintree, Mass.

[73] Assignee: Integrated Fluidics, Inc., Plainville, Conn.

[21] Appl. No.: 131,751

[22] Filed: Dec. 11, 1987

[51] Int. Cl.[4] ............................................. F16K 7/12
[52] U.S. Cl. .................................. 251/61.1; 137/597; 137/884
[58] Field of Search ............... 251/61.1, 331; 137/597, 137/884

[56] References Cited

U.S. PATENT DOCUMENTS

| | | | |
|---|---|---|---|
| 3,083,943 | 4/1963 | Stewart, Jr. et al. | 251/331 X |
| 3,286,977 | 11/1966 | Miottel | 251/331 X |
| 3,749,353 | 7/1973 | Pauliukonis | 251/61.1 |
| 4,119,120 | 10/1978 | Mehaffy et al. | 251/61.1 X |
| 4,304,257 | 12/1981 | Webster | 251/331 X |

*Primary Examiner*—Arnold Rosenthal

*Attorney, Agent, or Firm*—Hamilton, Brook, Smith & Reynolds

[57] ABSTRACT

A valve is disclosed comprising a first body portion (2) having a first surface (16), a second body portion (4) having a second surface (51) facing the first surface, a flexible sheet (8) positioned between the first and second surfaces, a void (4) in the first body portion created and defined by a concave surface (46) formed in the first surface and one side (18) of the flexible sheet. There are at least two fluid passageways (20) (22) in the first body portion communicating with the void at spaced locations, at least one of the fluid passageways being a channel formed in the first surface and terminating at the void. A source of pressure and vacuum (50) (54) is provided for flexing the sheet against and away from the first body portion in order that when the flexible sheet is flexed against the first body portion, the passageways are sealed from each other, and when the flexible sheet is flexed away from the first body portion the fluid passageways are placed in communication with each other by way of the void.

17 Claims, 4 Drawing Sheets

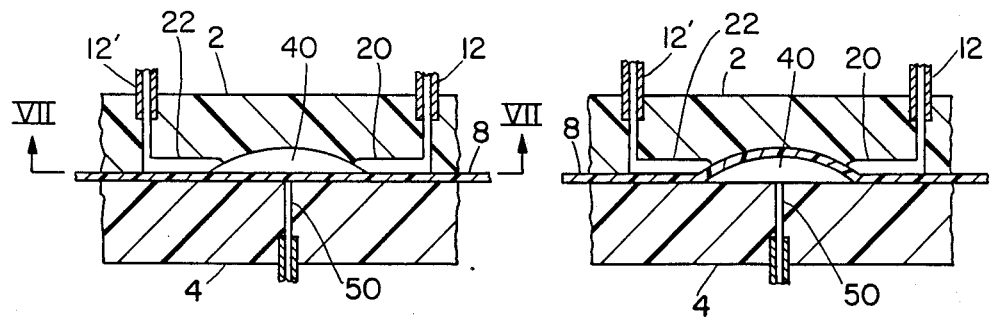
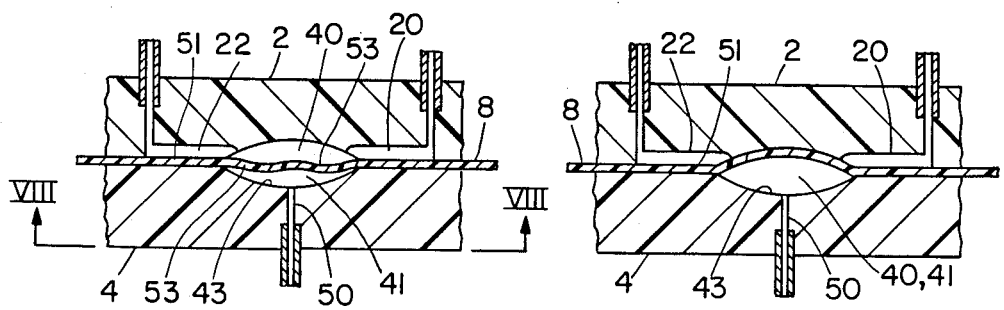
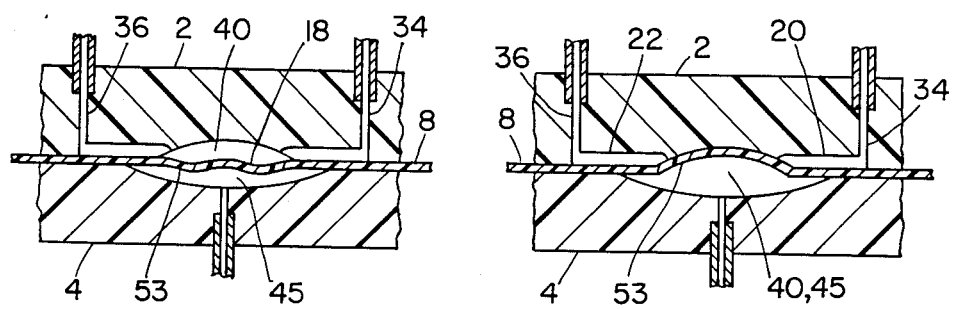

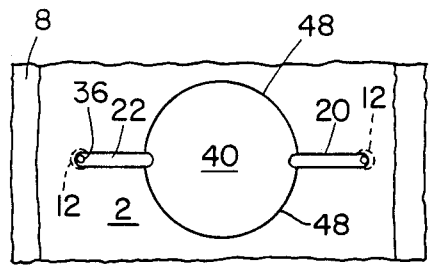
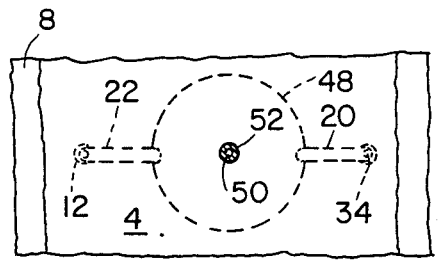
Fig. 7  Fig. 8
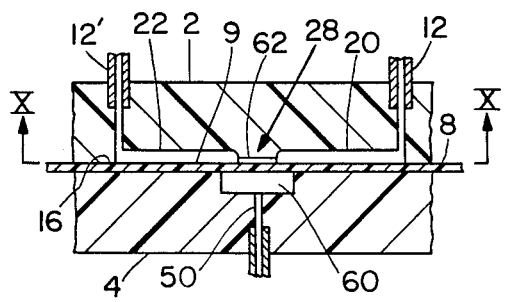
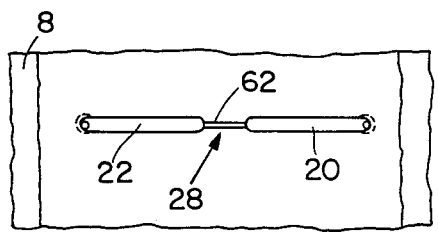
Fig. 9  Fig. 10
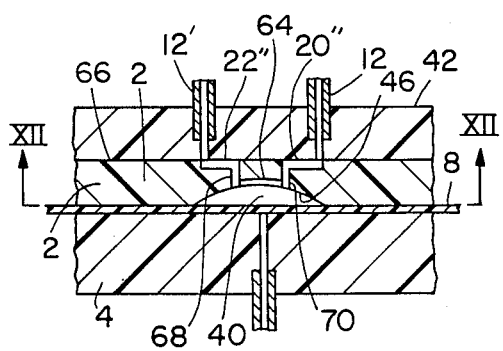
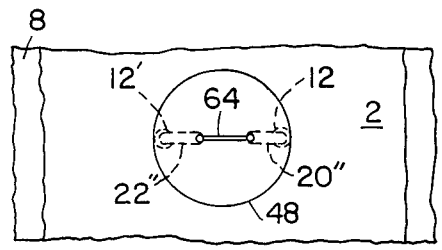
Fig. 11  Fig. 12

VALVE WITH FLEXIBLE SHEET MEMBER

FIELD OF THE INVENTION

This invention relates in general to valves and valve matrixes which are employed in flow networks for handling various types of fluids, and more particularly, it relates to valves that employ flexible sheet members for alternatively sealing and opening various valve ports and orifices.

BACKGROUND OF THE INVENTION

In accordance with an earlier invention covered by my U.S. Pat. No. 4,304,257, I disclosed a valve that includes a body member that has a firm and stable support surface and a flexible sheet member that has a surface for conforming and mating with the surface valve body member. There are at least two fluid flow channels in the surface of the body member separated from each other by a land portion. The surface of the land portion is coincident with the surface of the member in which it is formed; in this instance, the "firm and stable support surface" of the valve.

A mechanical actuator is employed to flex the sheet member between a first position in which a surface of the sheet is in mating and sealing engagement with the surface of the body member to block flow between the two channels and a second position in which the sheet surface is spaced from the first position to allow fluid flow across the land surface between the two flow channels.

The firm and stable support surface is disclosed as being flat as is the flexible sheet member that seals the flow channels.

The flexible sheet member is a manifold diaphragm sheet made of polyurethane or silicone and of sufficient thickness such that heads formed on the ends of stems of the mechanical actuators can be embedded in the sheet. This requires the sheet to have substantial thickness. Because the sheet is an elastomer, were it able somehow to be made thinner, it could be gas pervious which is undesirable.

The actuators are solenoid operated which are not only bulky but heavy and employ substantial power for actuation. This is somewhat limiting to the function of the valve, particularly when many similar valves are assembled together in a manifold environment. The actuators also require extremely sensitive adjustment.

In accordance with my earlier invention, the flexible sheet is pulled physically downwardly into an aperture so that the surface of the sheet which is engageable with the firm and stable support surface is withdrawn from that surface placing two or more fluid passageways in communication. The flexure is all in one direction, that is, downwardly from the horizontal and returned to the horizontal.

Also in accordance with my earlier invention, when the flexible sheet is pulled away from the support surface, it exposes the land which is coincident with the support surface. A space is created, which when filled with a fluid flowing from one channel or passageway, can then flow out the second or additional passageways in communication with the space. It would be desirable if flow across the land could be channeled or directed to permit such flow to take place substantially immediately upon the flexible sheet surface being withdrawn from the support surface rather than waiting for the space to become filled or substantially filled.

It would be desirable if the flexing of the flexible sheet could be reduced to a minimum to avoid undue stress concentration at any one point or points and secondly, to reduce the tendency of the sheet to become stressed beyond its yieldpoint.

It would also be desirable if the solenoid actuated means for physically pulling the flexible sheet downwardly away from the support surface could be replaced with something simpler and equally reliable. Having less bulk and weight and not requiring any adjustment at all, would be a substantial advantage. I have found that fluid pressure and vacuum are ideal for this purpose.

With the above objectives in mind, it has been possible to produce a flexible sheet valve which is lighter in weight, less bulky, less complicated, more reliable and less expensive than those made in accordance with my previous invention.

SUMMARY OF THE INVENTION

The present invention resides in a valve or valve manifold which may include more than one valve. It comprises at least one valve body member, also called a first body portion. The body has a first surface, also called the valve body surface. As in my earlier invention, the first surface is firm and stable. There is a flexible valve sheet member having a surface for conforming and mating engagement with the valve body surface. There are at least two fluid passageways, designated first and second passageways, at least one of which is formed in the surface of the valve body member. Separating the fluid passageways is a land portion located between them. To this point, the valve is essentially the same as the valve disclosed in my earlier patent.

In the earlier patent, the entire surface of the land portion was coincident with the surface of the first body portion.

According to the present invention, at least a part of the land portion, if not all, is depressed or channeled relative to the surface of the first body portion whereupon some, if not all of the land portion is not "coincident" with the firm and stable first surface as in my earlier patent.

There are means, hereinafter illustrated as pneumatic, provided for flexing the sheet member between a first position in which the valve sheet surface is in mating and sealing engagement with the valve body surface to sealingly block flow between the first and second passageways and a second position in which the sheet surface is spaced away from the first position to allow flow between the first and second passageways across the land portion.

In accordance with the present invention, the flow takes place, first through the depressed portion of the land, or canal as it is also called, as soon as the flexible sheet has moved a slight distance away from the first surface and before a substantial gap or void is created between the flexible sheet and the first surface. This speeds up the valve response time.

In my prior invention, the first or firm and stable surface, was disclosed as planar and hence, the land was planar. In the present invention, it is immaterial whether this surface and the land be planar. They may be arcuate or partially arcuate and partially planar as will become more evident hereinafter.

In accordance with another feature of the invention, the valve or manifold containing a plurality of valves includes a second body portion having a second surface which faces the first surface. A flexible sheet or valve sheet member is positioned between the first and second surfaces. A void is formed in the first body portion. It is created and defined by a concave surface formed in the first surface and by the side of the flexible sheet that faces the first surface.

There are at least two fluid passageways in the first body portion which communicate with the void and which passageways terminate in the concave surface. They are at spaced locations. Means are provided to flex the sheet against and away from the first body portion. When the flexible sheet is flexed away, the passageways are placed in communication with each other by way of the void. However, when the flexible sheet is forced against the first body portion including the first surface and the concave surface, the passageways are sealed from one another. In this embodiment of the invention the flexible sheet flexes in one direction only, in other words, from a flat configuration into and out of a convex configuration.

Since the area of the unflexed sheet is initially the flat circular area of the void measured as the truncation surface or plane which is the base of the void, it is less than the area it occupies when flexed because when it is flexed into engagement with the concave surface of the void, the flexible sheet is stretched and rendered free of wrinkles.

Another embodiment of the invention involves creating a void in the second body portion which is located on the opposite side of the flexible sheet. The second void is created and defined by a concave surface formed in the second surface and hence, in the second body portion and the surface of the sheet facing the second void.

Means are employed to flex the sheet toward and against the concave surface in the first body portion to seal the passageways and to flex the sheet away from the first concave surface returning it to the horizontal and then continuing in the same direction away from the horizontal into the second void. This depends upon the force of the flexing means. In the neutral position the flexible sheet is flat and unflexed, but since the concave surfaces are in this embodiment of the same dimension, their heights need only be on half as much as if there were only one. The flexure is equal in opposite directions as distinguished from my earlier invention where flexure was only from the horizontal to arcuate.

Thus, the amplitude of flexure is 50% in one direction and 50% in the other, thereby reducing the amount of bend in the flexible sheet in one direction by a half and thus increasing wear life. Also, the amount of permanent deformation of the flexible sheet is correspondingly reduced.

In accordance with another aspect of the invention the area of the base of the second concave surface and hence, the void, the second body portion is larger than that of the first concave surface. Thus, the void is larger.

For ease of manufacture, the voids may be made in the body portions by a ball end mill thereby resulting in voids which are truncated spheres. Hence, the land between the fluid passageways which communicate with the first void are spherical surfaces. In this embodiment as well, there are advantages to be gained by forming a canal directly from one passageway to another across the land surface which will not only aid the initial fluid flow from one passageway to another, but will provide additional surface area for the accommodation of any wrinkles which may be formed in the flexible sheet and thus, preclude undesirable pockets of fluid that would contribute to cross-contamination and carryover.

The passageways may be of many forms. They may be bores in the first body portion which pass directly into the first void. There may be channels or grooves formed in the first surface which intersect the void, or there may be any combination of grooves or bores which are alternately sealed from and exposed to one another.

In order to prevent the flexible film, which may be a polyester, as for example, a polyethylene film sold by Dupont under the tradename Mylar, from separating from the second surface when it is urged or biased into the sealing position, it is secured to that surface by pressure bonding or chemical bonding or an appropriate adhesive since this second surface is not in contact with the fluids passing through the valve system.

The above and other features of the invention including various novel details of construction and combinations of parts will now be more particularly described with reference to the accompanying drawings and pointed out in the claims. It will be understood that the particular valve with flexible sheet member embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 4 is a sectional view on an enlarged scale of one embodiment of the invention with the valve in open position.

FIG. 4a is the valve of FIG. 4 in closed position.

FIG. 5 is another embodiment of the valve in open position.

FIG. 5a is the valve of FIG. 5 in closed position.

FIG. 6 is another embodiment of the valve in open position.

FIG. 6a is the valve of FIG. 6 in closed position.

FIG. 7 is a sectional view taken on the line VII—VII of FIG. 4.

FIG. 8 is a sectional view taken on the line VIII—VIII of FIG. 5.

FIG. 9 is yet another embodiment of the valve.

FIG. 10 is a sectional view taken on the line X—X of FIG. 9.

FIG. 11 is still another embodiment of the valve.

FIG. 12 is a sectional view taken on the line XII—XII of FIG. 11.

DETAILED DESCRIPTION OF THE INVENTION

Figure 1:
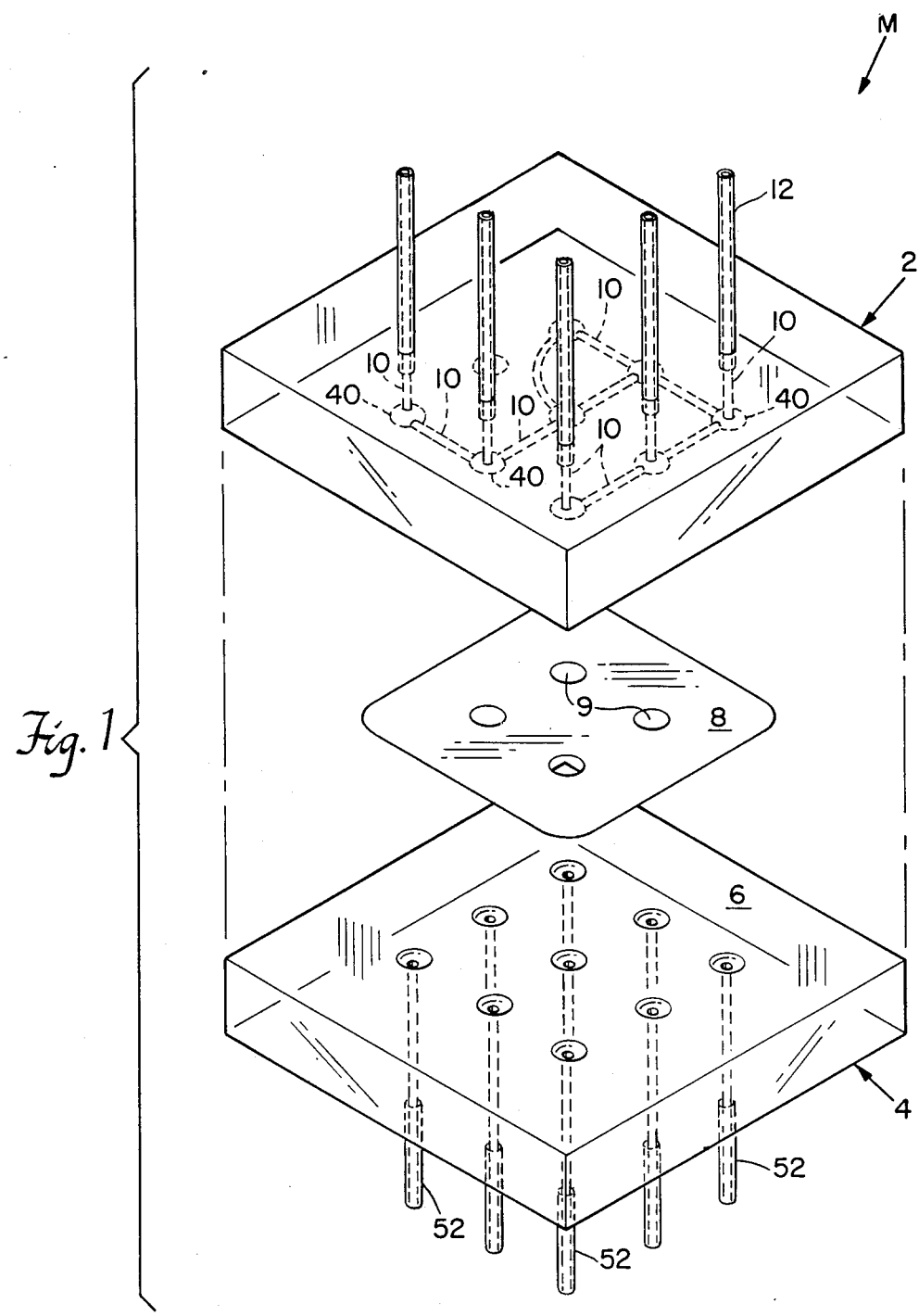
FIG. 1 is an exploded perspective view of a valve module having nine valves, on a larger-than-life scale, embodying the features of the invention.

In FIG. 1 there will be seen an exploded view of a valve array which is also known as a valve module or valve matrix designated by the reference character M.

The module M includes a first valve body member 2 and a second valve body member 4 which may also be referred to as the upper and lower valve body members, respectively. They may be made of acrylic material or any other non-corrosive, relatively inert material that may be machined or molded.

The valve body members engage one another at an interface 6. At the interface is located a flexible valve sheet member 8, which in the illustrative embodiment, is a sheet of polyethylene film of the type sold by Dupont under the tradename Mylar. In this instance the sheet of Mylar is approximately 0.0005 inches thick although it is not so limited. In fact, may be thicker or thinner depending upon the application. Holes 9 in the sheet 8 permit better bonding of the body members 2 and 4 and reduce the total force required to seal portions of the flexible sheet surface.

A plurality of passageways 10, through which fluid may flow, are formed in one of the body members, in this instance the upper or first body member 2. As will become more apparent hereinafter, the passageways 10 may be holes, grooves, channels or any convenient fluid conduit form. Various connecting tubes 12 lead to an from the passageways 10 to reservoir tubes and/or other equipment.

Figure 2:
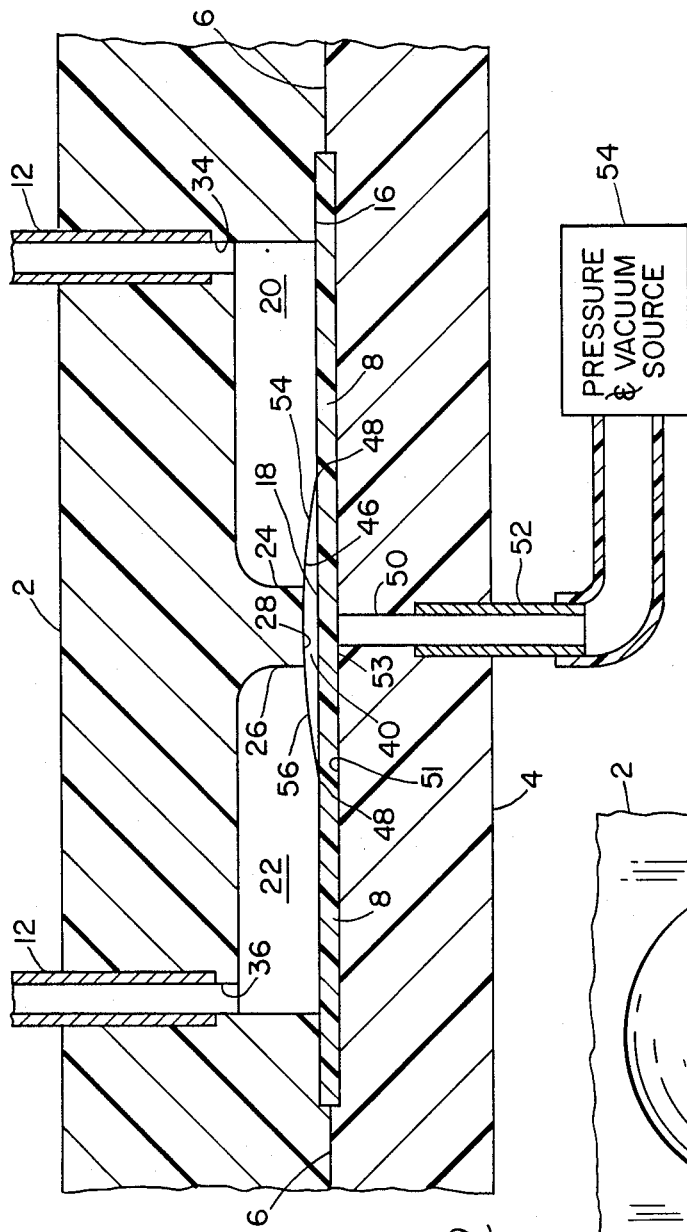
FIG. 2 is a sectional rendition, on a greatly enlarged scale, of one valve body.

A typical single valve will be seen in FIG. 2 in cross-section, substantially larger than actual or life size. The body portions 2 and 4 are secured to each other at the interface 6 with the flexible sheet 8 of Mylar sandwiched between them. The body members, for example, may be screwed or bolted to one another. In this instance they are bonded.

The first body member has a first surface 16. As in my earlier patent, surface 16 is a "firm and stable surface." The upper surface 18 of the sheet 8 is engageable with surface 16.

Figure 3:
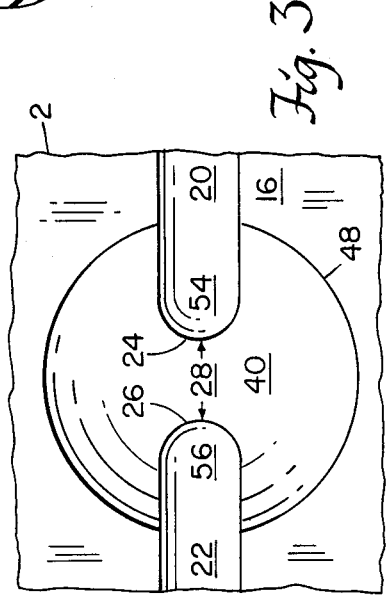
FIG. 3 is a bottom plan view of the actual valve site of the valve shown in FIG. 2.

Formed in the upper body portion 2 are a pair of elongate passageways 20 and 22 which in cross-section are semi-circular. These passageways are broadly illustrated in FIG. 1 as the passageways 10. They terminate at points 24 and 26 (FIG. 3) which are spaced from each other.

Between the terminal points 24 and 26 of the passageways 20 and 22, there is a portion of the first body member which is an arcuate land 28 as will be further understood hereinafter.

The ends of the passageway are each connected by transverse bores 34 and 36, to tubes 12 and 12 which, in turn, may be connected to fluid sources, reservoirs or other equipment. The purpose of the valve is to prevent and permit flow between the passageways 20 and 22.

A void 40 is formed in the first body portion 2 and is created and defined by a concave surface 46 formed in the first surface 16 and by the upper surface 18 of the flexible sheet 8 which faces the first surface 16. As seen in FIG. 2, the void 40 is a truncated sphere having a circumference 48 (FIG. 3) in the first surface 16. Hence the land 28 is arcuate.

In one embodiment of the invention, the land 28 is approximately 0.03 inches across, i.e., from point 24 to 26. The depth (or height) of the void is approximately 0.005 inch, the void having been formed by a ball end mill of 25/32 inch diameter. These dimensions are illustrative of one valve which has been found to work satisfactorily, but are not limiting of the invention.

A control passageway 50 connected by an appropriate conduit 52 to a source of pressure and/or vacuum 54. The control passageway 50 is formed in the second body member 4 and terminates in the second surface 51 which is the upper surface of the valve body portion 4. Accordingly, the control passageway is in communication with the lower surface 53 of the flexible sheet 8. When the control passageway 50 is pressurized, the flexible sheet 8 is caused to move upwardly into the void 40 and into sealing engagement with the land 28, sealing the intersections 54 and 56, where the passageways 20 and 22 intersect with the void 40.

As long as pressure remains against the lower surface 53 of the sheet 8, the valve will be in closed position. When pressure is reduced in the control passageway 50, or if it is a negative pressure, the sheet will return to the FIG. 2 position and fluid may flow between the passageways 20 and 22 by way of the void 40.

As thus described so far, the invention may be stated as residing in a valve which comprises a first body portion 2 which has a first surface 16. There is a second body portion 4 which has a second surface 51 which faces the first surface 16 and a flexible sheet 8 is positioned between the first and second surfaces. The void 40 is formed in the first body portion 2 and it is defined by the concave surface 46 intersecting the surface 16 in a circle periphery 48 and by the side 18 of the flexible sheet 8. The two fluid passageways 20 and 22 communicate with the void 40 at spaced locations 24 and 26. A pressure and/or vacuum source 54 connected to the control passageway 50, flexes the sheet toward and away from the first body portion 2 whereby when the sheet 8 is flexed upwardly, the passageways 20 and 22 are sealed from each other and when the flexible sheet 8 is flexed away from the first body portion as seen in FIG. 2, the fluid passageways are placed in communication with each other by way of the void 40.

As a practical matter, the lower surface of the sheet 8, i.e., surface 53 may be cemented or otherwise secured to the surface 51 of the lower body portion 4 outside of the periphery 48 of the void 40 to assure that the flexible sheet is not peeled from contact with the lower body portion which might prevent bubbles and leaks from occurring between the control passageway 50.

The opened and closed positions of the valve are shown schematically in FIGS. 4 and 4a. FIG. 4 shows the passageways 20 and 22 in open communication by way of the void 40 and FIG. 4a shows them being closed by the flexible sheet 8. The relative positions of the parts are also illustrated in FIGS. 7 and 8.

It will be noted that the actual flexure of the sheet 8 takes place at the periphery 48 of the void 40. When the sealing sheet 8 is in the closed position, i.e., that shown in FIG. 4a, the area of the flexed portion is greater than the flat area of the flexed portion which is a spherical dome when this area is defined by the surface 46 of the dome or void 48.

When a sheet is in the unflexed position or that shown in FIG. 4, the area of the portion 48 is that of a flat circle having a circumference 48. Thus, the sheet in flexed position against the surface 46 of the void is stretched to some extent whereby any wrinkles or voids are eliminated and good quality sealing takes place. The valve is also seen in FIG. 7.

Referring next to FIGS. 5 and 5a, another embodiment of the invention will be seen, wherein there is a second void 41 which is formed in the second body portion 4 of the valve. It is on the opposite side of the flexible sheet 8 and it is defined by a concave surface 43, also spherical, formed in the surface 51 of the lower body portion 4 and the opposite side 53 of the flexible sheet 8.

In this modification when the passageway 50 is pressurized, the void 41 is pressurized thereby causing the flexible sheet to move upwardly into the void 40 sealing the passageways 20 and 22 as seen in FIG. 5a. When the pressure in the control passageway 50 is allowed to fall to ambient, the pressure in the passageways 40 and 41 will be equal and the sheet will occupy the unflexed position as shown in FIG. 6. Note that it is wrinkled, having been stretched when first expanded upwardly. Conversely, if the pressure in the passageway 50 is negative, the flexible sheet 8 may be drawn down into the void 41 and engage the surface 43. In the position the valve is "open" and in the FIG. 5a position the valve is in the "closed" position.

Referring next to FIGS. 11 and 12, the valve is illustrated as not having a void in the upper body portion 2 but is constructed much the same as the valve shown in my prior patent. There is a chamber 60 in the lower or second body portion 4 to which the control passageway 50 is connected to permit the flexible member 8 to be drawn downwardly to open the valve as in my prior patent. However, the firm and stable surface 16 referred to in my prior patent which includes the land 28 between the passageways 20 and 22, is provided with a depression or groove or channel 62 between the passageways. In other words, at least a portion of the surface of the land, the portion being the channel 62, is depressed relatively to the surface 16 of the valve body portion 2. Thus, not all of the land portion 28 is coincident with the firm and stable surface 16. In this embodiment, when the valve is open, flow takes place first through the depressed portion or channel 62 as it is also called, as soon as the flexible sheet 8 has moved a slight distance away from the surface 16 and before a substantial gap or void is created between the flexible sheet surface 9 and the surface 16. This speeds up the valve response time. The channel 62 provides more surface area and thereby compensates for the wrinkles and precludes fluid entrapment.

The same concept is illustrated in FIG. 11 where there is a void 40 in the first body portion 2 and where there is an arcuate canal 64 formed in the surface 46 of the void 40. The same principle of operation applies as in the FIG. 9 embodiment.

FIG. 11 also illustrates another embodiment wherein the passageways 20″ and 22″ are formed as channels in the uppermost surface 66 of the upper body portion 2 and communicate with the void 40 by way of vertical passageways 68 and 70. A backing body member 72 engages the surface 66 of the body member 2 and, in effect, seals the passageways 20″ and 22″. The pipes or conduits 12 are thus formed in the backing member 72 where heretofore they had been fitted into the first body portion 2 directly.

I claim:
1. A valve comprising:
a first body portion having a first substantially flat surface,
a second body portion having a second substantially flat surface facing the first surface,
a flexible sheet positioned between the first and second surfaces,
a fluid receiving chamber comprising a void in the first body portion created and defined by a concave surface formed in the first substantially flat surface and a first side of the flexible sheet,
at least two fluid passageways formed in the first body portion communicating at spaced locations with the void which forms the fluid receiving chamber,
at least one of the fluid passageways being a channel formed in the first substantially flat surface laterally of the void and progressing to and terminating in the void,
the channel being defined jointly by a portion of the first body portion which is located laterally of the concave surface and by the first surface of the flexible sheet which is engagable with the first substantially flat surface and the concave surface in the first body portion,
means for flexing the sheet against and away from the concave surface formed in the first body portion,
in order that when the flexible sheet is flexed against concave surface in the first body portion, the passageways are sealed from each other, and
when the flexible sheet is flexed away from the concave surface in the first body portion the fluid passageways are placed in communication with each other by way of the fluid receiving chamber comprising the void.
2. A valve according to claim 1 wherein the concave surface is spherical.
3. A valve according to claim 1 wherein the void is a truncated sphere.
4. A valve according to claim 1 wherein the means for flexing is a source of variable fluid pressure connected to a control passageway in the second body portion communicating with the side of the flexible sheet that faces away from the first surface.
5. A valve according to claim 1 wherein there is a depression in the concave surface between the spaced locations where the fluid passageways intersect the concave surface.
6. A valve comprising:
a first body portion having a first substantially flat surface,
a second body portion having a second substantially flat surface facing the first surface,
a flexible sheet secured between the first and second surfaces,
a fluid receiving chamber comprising a first void in the first body portion created and defined by a first concave surface formed in the first substantially flat surface and a first side of the flexible sheet,
at least two fluid passageways formed in the first body portion communicating at spaced locations with the void which forms the fluid receiving chamber,
at least one of the fluid passageways being a channel formed in the first substantially flat surface laterally of the void and progressing to and terminating in the first void,
the channel being defined jointly by a portion of the first body portion which is located laterally of the concave surface and by the first surface of the flexible sheet which is engagable with the first substantially flat surface and the concave surface in the first body portion,
a second void in the second body portion aligned with the first void and on the opposite side of the flexible sheet,
the second void being created and defined by a second concave surface formed in the second surface and the opposite side of the flexible sheet, means for flexing the sheet against and away from the concave surface formed in the first substantially flat surface, in order that when the flexible sheet is flexed against the concave surface formed in the first substantially flat surface, the fluid passageways are sealed from each other, and when the flexible sheet is flexed away from said concave surface formed in the first surface the fluid passageways are placed in communication with each other by way of the fluid receiver chamber comprising the first void.

7. A valve according to claim 6 wherein the voids are of unequal diameters.

8. A valve according to claim 6 wherein the area defined by the second concave surface is greater than that defined by the first concave surface.

9. A valve according to claim 6 wherein the concave surfaces are spherical.

10. A valve according to claim 6 wherein the voids are truncated spheres.

11. A valve according to claim 6 wherein the means for flexing is a source of variable fluid pressure connected to a control passageway in the second body portion communicating with the side of the flexible sheet that faces away from the first surface.

12. A valve according to claim 6 wherein there is a depression in the first concave surface between the spaced locations where the fluid passageways intersect the first concave surface.

13. A valve comprising:
a first body portion having a first substantially flat surface,
a second body portion having a second substantially flat surface facing the first surface,
a flexible sheet secured between the first and second surfaces,
a fluid receiving chamber comprising a first void in the first body portion created and defined by a first concave surface formed in the first substantially flat surface and a first side of the flexible sheet,
at least two fluid passageways formed in the first body portion communicating at spaced locations with the void which forms the fluid receiving chamber,
at least one of the fluid passageways being a channel formed in the first substantially flat surface laterally of the void and progressing to and terminating in the void,
the channel being defined jointly by a portion of the first body portion which is located laterally of the concave surface and by the first surface of the flexible sheet which is engagable with the first substantially flat surface and the concave surface in the first body portion,
a second void in the second body portion aligned with the first void and on the opposite side of the flexible sheet,
the second void being created and defined by a second concave surface formed in the second surface and the opposite side of the flexible sheet,
means for flexing the sheet against and away from the concave surface formed in the first substantially flat surface,
in order that when the flexible sheet is flexd against the first concave surface, the fluid passageways are sealed from each other, and
when the flexible sheet is flexed away from said concave surface formed in the first surface the fluid passageways are placed in communication with each other by way of the fluid receiving chamber comprising the first void,
the second concave surface and hence, the void in the second body portion, having a larger diameter than the first concave surface and hence the void in the first body portion,
so that equal pressure in both voids will create a greater force on the surface of the sheet which faces the larger void.

14. A valve according to claim 13 wherein at least one of the fluid passageways is a channel formed in the first surface.

15. A valve according to claim 13 wherein the concave surfaces are spherical.

16. A valve according to claim 13 wherein the voids are truncated spheres.

17. A valve according to claim 13 wherein the means for flexing is a source of positive and negative fluid pressure connected to a control passageway in the second body portion communicating with the side of the flexible sheet that faces away from the first surface.

* * * * *